(12) United States Patent
Tavakoli et al.

(10) Patent No.: US 11,482,897 B2
(45) Date of Patent: Oct. 25, 2022

(54) WOUND-TYPE ROTOR FOR A SYNCHRONOUS ELECTRIC MACHINE

(71) Applicants: Renault s.a.s., Boulogne-Billancourt (FR); NISSAN MOTOR CO., LTD., Yokohama (JP)

(72) Inventors: Shahab Tavakoli, Vaucresson (FR); Joel Pressoir, Grand-Bourgtheroulde (FR)

(73) Assignees: Renault s.a.s., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 87 days.

(21) Appl. No.: 17/046,063

(22) PCT Filed: Apr. 4, 2019

(86) PCT No.: PCT/EP2019/058486
§ 371 (c)(1),
(2) Date: Oct. 8, 2020

(87) PCT Pub. No.: WO2019/197266
PCT Pub. Date: Oct. 17, 2019

(65) Prior Publication Data
US 2021/0099037 A1  Apr. 1, 2021

(30) Foreign Application Priority Data

Apr. 12, 2018  (FR) ..................... 1853220

(51) Int. Cl.
*H02K 1/24* (2006.01)
*H02K 3/52* (2006.01)
(Continued)

(52) U.S. Cl.
CPC ............... *H02K 1/24* (2013.01); *H02K 7/04* (2013.01); *H02K 15/022* (2013.01); *H02K 15/165* (2013.01)

(58) Field of Classification Search
CPC ............ H02K 3/00; H02K 3/52; H02K 3/527; H02K 7/00; H02K 7/04; H02K 15/00;
(Continued)

(56) References Cited

U.S. PATENT DOCUMENTS

| 4,697,114 | A | * | 9/1987 | Amemiya | ............ | H02K 1/2773 |
| | | | | | | 29/598 |
| 2008/0174200 | A1 | * | 7/2008 | Okamoto | ............... | H02K 15/02 |
| | | | | | | 29/598 |

(Continued)

FOREIGN PATENT DOCUMENTS

| DE | 102011121793 A1 * | 6/2013 | ............. H02K 3/527 |
| FR | 2 792 981 A1 | 11/2000 | |

(Continued)

OTHER PUBLICATIONS

International Search Report dated Jun. 12, 2019 in PCT/EP2019/058486 filed Apr. 4, 2019, citing documents AA-AC and AO-AU therein, 2 pages.

*Primary Examiner* — Tran N Nguyen
(74) *Attorney, Agent, or Firm* — Oblon, McClelland, Maier & Neustadt, L.L.P.

(57) ABSTRACT

A rotor includes an assembly of laminations including a plurality of radially-projecting poles, a winding of electrically conductive wires to be wound around each pole by means of wire-guiding heads arranged axially on either side of the lamination assembly. A guiding head support is inserted between the lamination assembly and each guiding head such that: an internal radial face of the support abuts against an external radial face at an axial end of the lamination assembly; and a peripheral surface of the sup- (Continued)

port, which projects axially outward from the internal radial face of the support, is in contact with a contact face of the guiding head that is orientated radially outward from same, the guiding head abutting against the peripheral surface of the support.

11 Claims, 1 Drawing Sheet

(51) Int. Cl.
    *H02K 7/04*     (2006.01)
    *H02K 15/02*     (2006.01)
    *H02K 15/16*     (2006.01)

(58) Field of Classification Search
    CPC ...... H02K 15/02; H02K 15/022; H02K 15/16; H02K 15/165
    See application file for complete search history.

(56) References Cited

U.S. PATENT DOCUMENTS

| | | |
|---|---|---|
| 2013/0106211 A1 | 5/2013 | Holzner |
| 2014/0368068 A1 | 12/2014 | Birolleau et al. |
| 2019/0149015 A1 | 5/2019 | Boisson et al. |

FOREIGN PATENT DOCUMENTS

| | | |
|---|---|---|
| FR | 2 984 034 A1 | 6/2013 |
| FR | 2 984 626 A1 | 6/2013 |
| JP | 56-141759 A | 11/1981 |
| JP | 59-47954 A | 3/1984 |
| WO | WO 2012/007920 A1 | 1/2012 |
| WO | WO 2017/194254 A1 | 11/2017 |

* cited by examiner

WOUND-TYPE ROTOR FOR A SYNCHRONOUS ELECTRIC MACHINE

TITLE

Wound-type rotor for a synchronous electric machine

BACKGROUND

The present invention relates to the field of wound rotor synchronous electric machines. It relates more particularly to a rotor for a wound rotor-type synchronous electric machine, including a rotor shaft intended to be mounted rotationally around the axis thereof, an assembly of laminations mounted coaxially on the rotor shaft, said assembly of laminations including a plurality of radially salient poles and at least one axial opening, a winding of electrically conductive wires being intended to be wrapped around each pole, guide heads for guiding the electrically conductive wires around each pole being arranged axially on either side of the assembly of laminations, each guide head being supplied with a central orifice for passage of the shaft.

A field of use of the invention is that of the electric machines used in electric or hybrid motor vehicles.

The patent document FR 2 984 034 describes a wound rotor, notably used in an electric machine for an electric drive motor vehicle, incorporating a guiding device for fixing the wires of the windings around the poles produced by a stack of laminations.

High-speed rotors are subjected to difficult operating conditions and notably to high stresses in the radial direction. In particular, the windings of the rotor are subjected to large centrifugal forces during the operation of the rotor and must be firmly held. The two heads guiding the wires of the winding (also called "end coil guide") are also extremely stressed during the rotation of the rotor by centrifugal force and must therefore be adapted to operate under such conditions. Thus, each guide head is conventionally rigidly connected to a ring, which is a piece independent of the body of the rotor, placed at the outer periphery of a guide head, such as to form a means for radially holding the guide head. More precisely, the ring has an annular configuration around the outer periphery of the guide head, the profile thereof having an L-shape including a wing orientated axially and bearing on the outer periphery of the guide head and a wing orientated radially toward the axis and bearing on an end radial face of each pole of the guide head. To allow the ring to be fixed to the guide head, the ring includes orifices at the radial wing thereof, which are intended to allow the passage of stays. The end radial faces of the poles of the guide head and the assembly of laminations include corresponding orifices, such that the stays can axially pass through the ring, the guide head and the assembly of laminations as far as the opposite side of the rotor, where a locking nut is screwed to the free end of each stay emerging from the opposite ring. When the nut is tightened with a sufficient torque, typically as far as the plastic limit of the stay, the entity is held firmly such as to remain assembled when the rotor is subjected to strong centrifugal forces.

However, this arrangement of rings for radially holding the guide heads requires a large number of pieces, namely the rings themselves, the stays and nuts, ultimately resulting in an increase in weight. Furthermore, this arrangement requires a large number of assembling operations (putting the stays through, operations for screwing the nuts), and the intention is to attempt to reduce this.

Optionally, to balance the rotor, a balancing loop can be fixed on the external side of the radial wing of the ring, this loop being provided with cavities circumferentially distributed around the latter. The operation for balancing the rotor consists in inserting balancing masses into some of the cavities which are circumferentially distributed or in removing material from the loop, by boring into the loop. However, this balancing device has a disadvantage in that the balancing masses are installed on a balancing loop. As a result, this requires the presence of a loop, at the expense of the weight, and an operation for fixing this balancing loop on the ring.

BRIEF SUMMARY

In this context, the aim of the present invention is to propose a rotor which is not affected by the aforementioned limitations.

To this end, the rotor of the invention, moreover in accordance with the generic definition thereof given by the above preamble, is essentially characterized in that it comprises a guide head support inserted between said assembly of laminations and each guide head such that an internal radial face of said support bears against an axial end external radial face of said assembly of laminations, and that a peripheral surface of said support projecting axially outward from the internal radial face thereof is in contact with a contact face of said guide head oriented radially toward the outside thereof, such that said guide head radially abuts against said peripheral surface of said support.

Advantageously, said guide head support is shrink-fitted onto the rotor shaft.

Preferably, said guide head is shrink-fitted onto said guide head support.

Alternatively or additionally, said guide head is shrink-fitted onto the rotor shaft.

Advantageously, said peripheral surface of said guide head support has an external edge suitable for axially jutting out beyond an external edge of said contact face of said guide head, such as to allow the addition of balancing masses (via weld points for example) in an area located between the respective external edges of said contact face of said guide head and of said peripheral surface of said guide head support, in order to balance the rotor.

Preferably, each guide head is provided, on an external face thereof, away from said guide head support with respect to said guide head, with circumferentially distributed cavities, open axially toward the outside of said guide head, said cavities being suitable for receiving balancing masses in order to balance the rotor (by injection of a dense material, for example by injection of a high-density plastic material).

Advantageously, since each of said guide heads comprises a plurality of branches extending radially from a central cylindrical core provided with said central orifice, each of said cavities extends circumferentially between two branches of said guide head.

Advantageously, said guide head support is produced as a unitary piece, made from an aluminium or steel alloy. Said support is preferentially obtained by stamping, machining or casting.

The invention also relates to a method of mounting a rotor as described above, said method comprising:

a step for shrink-fitting each of said guide head supports onto the rotor shaft on either side of said assembly of laminations, at the same time as shrink-fitting said assembly of laminations onto said rotor shaft, a step for mounting said guide head on each of said guide head supports which are assembled on either side of said assembly of laminations, and a step for winding electrically conductive wires around each pole via said guide heads.

Such a mounting method is particularly simple to implement.

Advantageously, the method can also include a step for balancing the rotor by adding material into cavities provided on the guide heads and/or on areas provided between respective external edges of said contact face of said guide head and of said peripheral surface of said guide head support, said external edge of said peripheral surface of said guide head support axially jutting out beyond said external edge of said contact face of said guide head.

BRIEF DESCRIPTION OF THE DRAWINGS

Other features and advantages of the invention will emerge from reading the following description of a specific embodiment of the invention, which embodiment is given in an indicative but nonlimiting manner, with reference to the appended drawings wherein.

DETAILED DESCRIPTION

Figure 1:
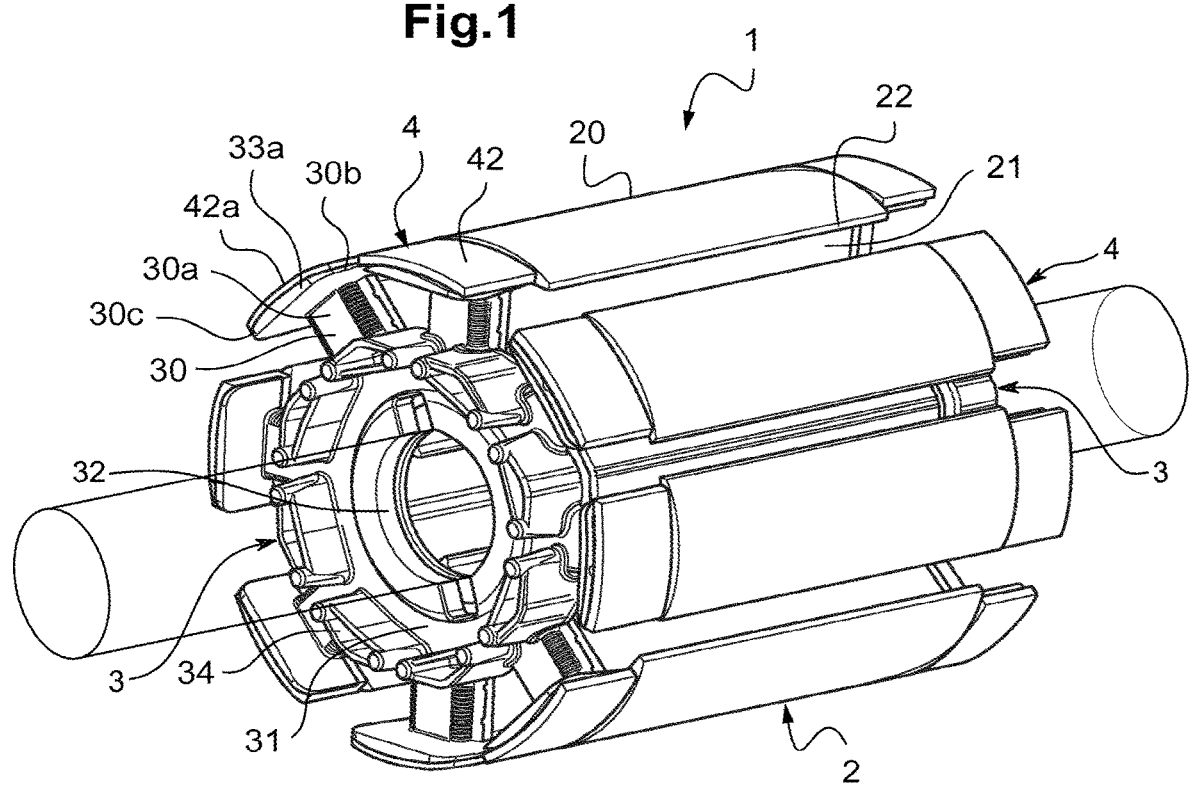
FIG. 1 schematically represents a perspective view of an electric motor rotor according to the invention.
Figure 2:
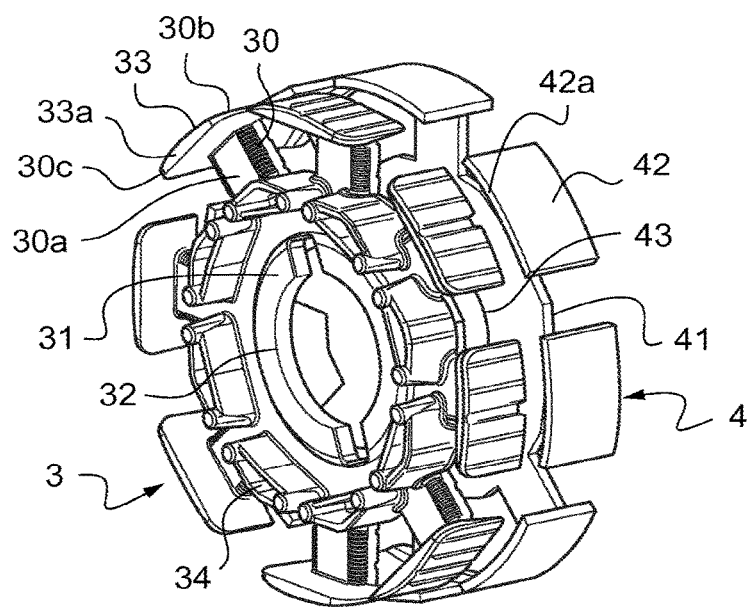
FIG. 2 is a detail view of the rotor of FIG. 1, in exploded perspective, illustrating, in isolation, the guide head and the support thereof, before the head is positioned in the support.

FIG. 1 illustrates an electric machine rotor 1. The rotor 1 comprises a shaft 10 (represented as transparent so as not to obscure surrounding structure), which extends axially through the rotor.

An assembly of laminations 2 is mounted coaxially on the rotor shaft. This assembly of laminations 2 is formed from an axial stack of laminations, which extend in a radial plane perpendicular to the axis of the rotor shaft. In this radial plane, the laminations of the assembly of laminations all have an identical contour. This assembly of laminations includes salient poles 20, which are distributed regularly in a circumferential direction and salient from the shaft toward the outer periphery of the rotor. In the embodiment described with reference to the figures, the assembly of laminations includes eight salient poles 20. However, the invention is not limited to this type of configuration and is used for an assembly of laminations including a plurality of salient poles and, preferentially, at least three poles.

The assembly of laminations 2 is shrink-fitted onto the cylindrical external surface of the shaft of the rotor. Thus, the assembly of laminations 2 is contracted onto the cylindrical external surface of the shaft of the rotor.

Each pole 20 is made up of an arm 21 which extends radially toward the outer periphery of the rotor. The free end 22 of the pole 20 ends with a return circumferentially salient on either side of the arm 21. The function of the salient return 22 of each pole 20 is to retain, in the radial direction, an electrically conductive exciting winding, which is wrapped around the radial arm 21 of each pole 20, against the centrifugal force experienced by the exciting winding during the rotation of the rotor.

Each pole 20 thus includes an exciting winding. Guide heads 3 are mounted coaxially with respect to the shaft of the rotor on either side of the assembly of laminations 2, in order to guide conductive wires forming the exciting winding around each pole 20. Each guide head 3 placed on either side of the assembly of laminations 2 generally has the shape of a disk extending in a radial plane perpendicular to the axis of the shaft of the rotor. The guide heads 3 are a unitary piece and are preferentially produced from a plastic with a high mechanical strength and are obtained, for example, by molding, for example of a thermosetting plastic.

Thus, in the example illustrated in the figures, each guide head 3 comprises eight branches 30 extending radially from a central cylindrical core 31, provided with a central orifice 32 for coaxial mounting on the shaft, each radial branch 30 of the guide head 3 being intended to be positioned opposite a respective pole of the 20 of the rotor 1, such as to allow winding. More precisely, each branch 30 includes a main portion 30a, which is intended to receive a set of conductive wires, said main portion 30a being placed opposite a radial arm 21 of each pole 20 of the assembly of laminations 2 of the rotor 1 and being defined at the end thereof away from the central cylindrical core 31 by two shoulders 30b, 30c, placed opposite the return 22 circumferentially salient on either side of the arm 21 of each pole. The conductive wire of the exciting winding of each pole is therefore wound around the main portion 30a of the corresponding branch of the guide head between the two shoulders 30b, 30c in a direction parallel to the shoulders 30b, 30c.

As illustrated in the figures, the guide heads 3 for guiding the electrically conductive wires around the poles, which are placed axially on either side of the assembly of laminations 2, are not directly in contact with the assembly of laminations 2. Thus, in accordance with the invention, a guide head support 4 is inserted between the assembly of laminations 2 and each guide head 3. The guide head support 4 includes an internal radial face 41, extending in a radial plane perpendicular to the axis of the shaft of the rotor and provided with a central orifice 43 for coaxial mounting on the shaft, which face is intended to bear against an axial end external radial face of the assembly of laminations 2, and a peripheral surface 42, projecting axially outward from the internal radial face 41, intended to come into contact with a contact face 33 of the guide head 3, which is oriented radially toward the outside thereof, when the guide head is positioned in the support thereof, such that the guide head 3 abuts radially against the peripheral surface 42 of the support. This contact face 33 of the guide heads 3 is made up by the peripheral external surfaces extending circumferentially along the two shoulders 30b, 30c of the branches 30 of the guide head 3. Thus, the guide head supports 4, placed axially on either side of the assembly of laminations 2 such that the internal radial faces 41 of these supports 4 bear against the end axial external radial faces of the assembly of laminations 2, define a respective annular accommodating housing for a guide head 3 of the rotor 1, outwardly defined by the peripheral surface 42 projecting axially outward from the internal radial face 41. The guide head 3 is therefore provided to abut radially outward against an internal face of the peripheral surface 42 of the support 4, which extends axially outward from the internal radial face 41 of the support 4 in contact with the assembly of laminations 2.

The guide head support 4 is advantageously shrink-fitted onto the rotor shaft at the same time as the assembly of laminations 2 is shrunk onto the rotor shaft.

The guide head support 4 is designed as a unitary piece, obtained for example by molding or casting, or by sheet metal stamping. It is preferentially made from an aluminium or steel alloy. Such an embodiment of said support makes it possible to facilitate the shrinking of the support onto the shaft of the rotor.

Once the guide head support 4 has been fixed on the shaft, the guide head 3 is positioned in the support 4 thereof before the operation of winding the wires around the poles of the rotor.

The guide head 3 can be shrink-fitted onto the guide head support 4. In other words, the two concentric surfaces, the peripheral surface 42 of the support 4, which surface is located on the outside, and the peripheral surface 33 of the guide head 3, which surface is located inside, respectively, are joined by shrinking. Alternatively or additionally, the guide head 3 is shrink-fitted onto the rotor shaft. Once assembled, the guide head support 4 forms a reinforcement for the guide head 3 against the substantial radial efforts imposed on the coils of the rotor during the operation thereof. In other words, the guide head support 4 advantageously replaces the ring currently used for this purpose, which consequently makes it possible to omit the stays and nuts previously used to fix such a ring and, as a result, the associated screwing operations.

Furthermore, the operation for balancing the rotor 1 can advantageously be implemented without requiring a balancing loop. Indeed, it is advantageously envisaged that the peripheral surface 42 of the guide head support 4 has an external edge 42a, which axially juts out from an external edge 33a of the contact face 33 of the guide head 3 when the latter is positioned in the support 4, such that the balancing operation can be provided by adding balancing masses in the area located between the respective external edges of the contact face 33 of the guide head 3 and of the peripheral surface 42 of the guide head support 4 that axially juts out, by adding material, for example by injection of a high-density plastic material or by adding weld point mass on the surface 42a. Furthermore, each guide head 3 can be provided, on an external face thereof, away from the support 4 with respect to the guide head 3, with circumferentially distributed cavities 34, open axially toward the outside of the guide head. Preferentially, each cavity 34 extends circumferentially between two branches 30 of the guide head 3. Thus, alternatively or additionally, the operation for balancing the rotor 1 consists in inserting balancing masses or in injecting a dense material, for example dense plastic material, into some of the cavities 34 of the guide head 3, which are circumferentially distributed between the branches 30 of the guide head 3.

The invention claimed is:

1. A rotor for a wound rotor-type synchronous electric machine, comprising:
 a rotor shaft configured to be rotationally mounted around the axis thereof,
 an assembly of laminations mounted coaxially on the rotor shaft, said assembly of laminations including a plurality of radially salient poles and at least one axial opening, a winding of electrically conductive wires being configured to be wrapped around each pole,
 guide heads for guiding the electrically conductive wires around each pole being arranged axially on either side of the assembly of laminations, each guide head being supplied with a central orifice for passage of the shaft and
 a guide head support including an internal radial face inserted between said assembly of laminations and each guide head such that the internal radial face of said guide head support bears against an axial end external radial face of said assembly of laminations,
 wherein a peripheral surface of said guide head support projecting axially outward from the internal radial face thereof is in contact with a contact face of said guide head oriented radially toward the outside thereof, such that said guide head radially abuts against said peripheral surface of said guide head support, and said guide head support is shrink-fitted onto the rotor shaft.

2. The rotor as claimed in claim 1, wherein said guide head is shrink-fitted onto said guide head support.

3. The rotor as claimed in claim 1, wherein said guide head is shrink-fitted onto the rotor shaft.

4. The rotor as claimed in claim 1, wherein said peripheral surface of said guide head support has an external edge suitable for axially jutting out beyond an external edge of said contact face of said guide head, such as to allow the addition of balancing masses in an area located between the respective external edges of said contact face of said guide head and of said peripheral surface of said guide head support, in order to balance the rotor.

5. The rotor as claimed in claim 1, wherein each guide head is provided, on an external face thereof, away from said guide head support with respect to said guide head, with circumferentially distributed cavities, open axially toward the outside of said guide head, said cavities being configured to receive balancing masses in order to balance the rotor.

6. The rotor as claimed in claim 5, wherein, since each guide head comprises a plurality of branches extending radially from a central cylindrical core provided with said central orifice, each of said cavities extends circumferentially between two branches of said guide head.

7. The rotor as claimed in claim 1, wherein said guide head support is produced as a unitary piece, made from an aluminium or steel alloy.

8. A method of mounting a rotor as claimed in claim 1, said method comprising:
 shrink-fitting each of said guide head supports onto the rotor shaft on either side of said assembly of laminations, at the same time as shrink-fitting said assembly of laminations onto said rotor shaft,
 mounting said guide head on each of said guide head supports which are assembled on either side of said assembly of laminations such that an internal radial face of the guide head support is positioned between the assembly of laminations and each guide head, and
 winding electrically conductive wires around each pole via said guide heads.

9. The method as claimed in claim 8, further comprising balancing the rotor by adding material into cavities provided on the guide heads and/or on areas provided between respective external edges of said contact face of said guide head and of said peripheral surface of said guide head support, said external edge of said peripheral surface of said guide head support axially jutting out beyond said external edge of said contact face of said guide head.

10. The rotor as claimed in claim 1, wherein said guide heads are not directly in contact with the assembly of laminations.

11. The method as claimed in claim 8, wherein said guide heads are not directly in contact with the assembly of laminations.

* * * * *